(12) United States Patent
Ma et al.

(10) Patent No.: US 11,878,426 B2
(45) Date of Patent: Jan. 23, 2024

(54) BIPED ROBOT GAIT CONTROL METHOD AND ROBOT AND COMPUTER READABLE STORAGE MEDIUM USING THE SAME

(71) Applicant: UBTECH ROBOTICS CORP LTD, Shenzhen (CN)

(72) Inventors: Xingxing Ma, Shenzhen (CN); Chunyu Chen, Shenzhen (CN); Ligang Ge, Shenzhen (CN); Hongge Wang, Shenzhen (CN); Mingqiang Huang, Shenzhen (CN); Jiangchen Zhou, Shenzhen (CN); Yizhang Liu, Shenzhen (CN); Zheng Xie, Shenzhen (CN); Youjun Xiong, Shenzhen (CN)

(73) Assignee: UBTECH ROBOTICS CORP LTD, Shenzhen (CN)

( * ) Notice: Subject to any disclaimer, the term of this patent is extended or adjusted under 35 U.S.C. 154(b) by 383 days.

(21) Appl. No.: 17/314,039

(22) Filed: May 6, 2021

(65) Prior Publication Data
US 2022/0152827 A1  May 19, 2022

(30) Foreign Application Priority Data
Nov. 17, 2020 (CN) .......................... 202011284461.8

(51) Int. Cl.
*B25J 9/16* (2006.01)
(52) U.S. Cl.
CPC ............. *B25J 9/1666* (2013.01); *B25J 9/162* (2013.01); *B25J 9/1653* (2013.01)

(58) Field of Classification Search
CPC ........ B25J 9/1666; B25J 9/162; B25J 9/1653; B25J 9/1664; G05B 2219/40264; B62D 57/032; G06V 40/25
See application file for complete search history.

(56) References Cited

U.S. PATENT DOCUMENTS

| 5,337,235 A * | 8/1994 | Takahashi ............ B62D 57/032 180/8.5 |
| 2007/0156283 A1* | 7/2007 | Takenaka ............. B62D 57/032 700/245 |
| 2012/0158183 A1* | 6/2012 | Lim ........................ B25J 9/162 700/261 |
| 2019/0278288 A1* | 9/2019 | Xiong ................ G06K 7/10722 |

FOREIGN PATENT DOCUMENTS

CN         109987169 A        7/2019

* cited by examiner

*Primary Examiner* — Adam R Mott
*Assistant Examiner* — Alyzia N Dilworth (57) ABSTRACT

A biped robot gait control method as well as a robot and a computer readable storage medium are provided. During the movement, the system obtains a current supporting pose of a current supporting leg of the biped robot, and calculates a relative pose between the supporting legs based on the current supporting pose and a preset ideal supporting pose of a next step. The system further calculates modified gait parameters of the next step based on the relative pose between the two supporting legs and a joint distance between left and right ankle joints in an initial state of the biped robot when standing. Finally, the system controls the next supporting leg to move according to the modified gait parameters.

20 Claims, 5 Drawing Sheets

BIPED ROBOT GAIT CONTROL METHOD AND ROBOT AND COMPUTER READABLE STORAGE MEDIUM USING THE SAME

CROSS REFERENCE TO RELATED APPLICATIONS

The present disclosure claims priority to Chinese Patent Application No. 202011284461.8, filed Nov. 17, 2020, which is hereby incorporated by reference herein as if set forth in its entirety.

BACKGROUND

1. Technical Field

The present disclosure relates to robot motion technology, and particularly to a biped robot gait control method as well as a robot and a computer readable storage medium using the same.

2. Description of Related Art

Since biped robot is a kind of robot which is the most likely to serve humans in the environments where humans live and work, which have always been a popular research topic in robotic technology. In a scenario where biped robots work 1 coordinately, the relative distance between the robots may be very small. On the one hand, if only care about the end point accuracy of the biped robot without performing positional closed looping on the process of walking, it will cause the robot to collide with others. On the other hand, if the correction algorithm used by the robot only corrects the end point of the motion path, it will not be able to guarantee the time for the robot to reach the stop condition (i.e., the number of steps used by the robot to move to the end point), and thus cannot meet the consistency of the team of robots on the timeline, and may cause collisions between robots.

BRIEF DESCRIPTION OF THE DRAWINGS

To describe the technical schemes in the embodiments of the present disclosure or in the prior art more clearly, the following briefly introduces the drawings required for describing the embodiments or the prior art. It should be understood that, the drawings in the following description merely show some embodiments. For those skilled in the art, other drawings can be obtained according to the drawings without creative efforts.

DETAILED DESCRIPTION

In order to make the objectives, technical solutions, and advantages of the present disclosure clearer, the following further describes the present disclosure in detail with reference to the drawings and embodiments. It should be understood that, the embodiments described herein are only for explaining the present disclosure, and are not used to limit thereto.

Figure 1:
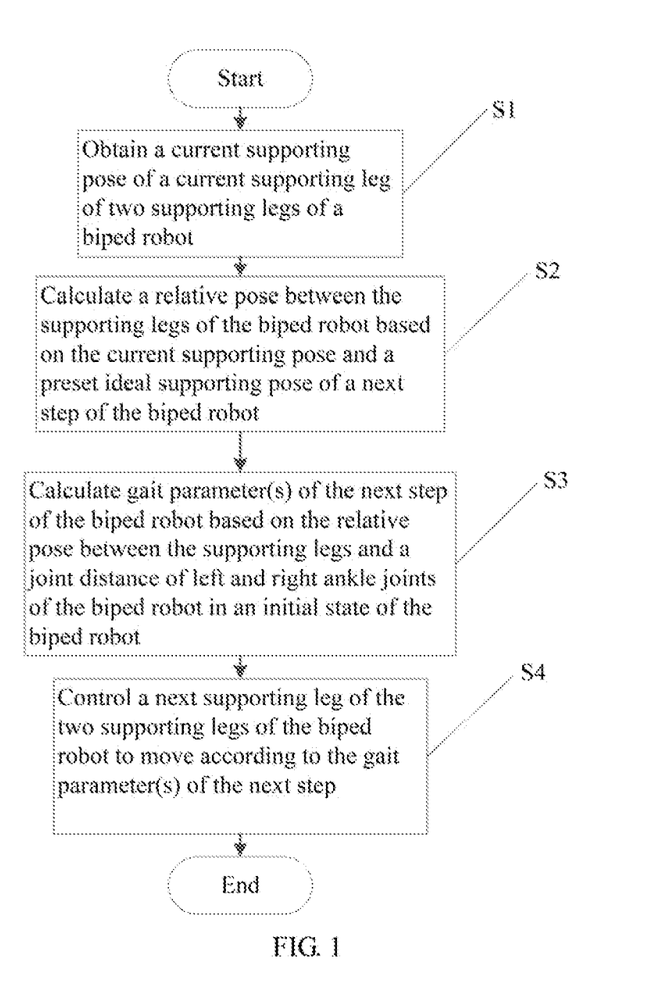
FIG. 1 is a flow chart of a biped robot gait control method according to an embodiment of the present disclosure.

FIG. 1 is a flow chart of a biped robot gait control method according to an embodiment of the present disclosure. In this embodiment, the biped robot gait control method is a computer-implemented method executable for a processor, which controls the gait of a biped robot. The biped robot has two supporting legs each including a hip joint, a knee joint, an ankle joint, and a foot. The method may be implemented through a biped robot gait control apparatus shown in FIG. 3 or a robot shown in FIG. 4. As shown in FIG. 1, the method includes the following steps.

S1: obtaining a current supporting pose of a current supporting leg of the two supporting legs of the biped robot.

S2: calculating a relative pose between the supporting legs of the biped robot based on the current supporting pose and a preset ideal supporting pose of a next step of the biped robot, where the relative pose between the support feet is the preset ideal supporting pose of the next step with respect to the current supporting pose.

S3: calculating gait parameter(s) of the next step of the biped robot based on the relative pose between the supporting legs and a joint distance of left and right ankle joints of the biped robot in an initial state of the biped robot.

S4: controlling a next supporting leg of the two supporting legs of the biped robot to move according to the gait parameter(s) of the next step.

In this embodiment, the system (e.g., the operating system or control system) of the biped robot has built a global coordinate system corresponding to the entire environment where the biped robot is currently located. The global coordinate system is fixed (i.e., it will not change its position with the movement of the biped robot), and the biped robot is moved according to a preset motion path in the entire environment. Hence, the global coordinate system may take the starting point of the motion path of the biped robot in the entire environment as its origin, and the motion path of the biped robot in the entire environment is represented by the corresponding coordinates of points in the global coordinate system. The biped robot is provided with a camera, and the positional relationship between the camera and the centroid (i.e., the center of mass) of the biped robot is fixed, that is, the coordinate conversion relationship between the two is fixed. Therefore, the system may calculate the pose (i.e., the position and the posture, which may include the displacement in the y direction of the global coordinate system, and the displacement in the x direction of the global coordinate system, and the yaw angle of the supporting legs of the biped robot in the z direction of the global coordinate system) of the camera in the global coordinate system through the image of the environment which is captured by the camera when the biped robot moves, so as to calculate the pose of the centroid in the global coordinate system, that is, the centroid pose, base on the coordinate conversion relationship between the camera and the centroid of the biped robot. Furthermore, a centroid coordinate system is also built in the system. The centroid coordinate system is built with the centroid of the biped robot as the origin of the coordinate system, and will move with the movement of the biped robot (the origin of the centroid coordinate system is on the biped robot, hence its position in the global coordinate system will change with the movement of the biped robot). In this embodiment, the midpoint of a straight line between the two hip joints of the biped robot is set as the centroid of the biped robot. The kinematic transformations from the centroid of the biped robot to the current supporting leg (the current supporting leg is the leg of the biped robot on which a force is currently acting on, for details, referring to the force acting on the legs of human body when walking) can be taken as a plurality of links (i.e., the hip joints corresponding to the centroid to the current supporting legs as well as the thigh and calve of the current supporting legs may be simply taken as links) to connect to each other, where the centroid and the current supporting leg are at the two ends of a head and tail link of the biped robot, respectively. The system obtains the positional relationship between the current supporting leg and the centroid through the current angle of each link (the joint of the biped robot), thereby obtaining the supporting pose of the current supporting leg in the centroid coordinate system. Then, the system obtains the current supporting pose of the current supporting leg in the global coordinate system through coordinate system conversion based on the supporting pose of the current supporting leg in the centroid coordinate system and the centroid pose of the centroid in the global coordinate system. The system calculates the relative pose between the supporting legs of the biped robot based on the current supporting pose and the preset ideal supporting pose of the next step of the biped robot.

In which, the preset ideal supporting pose of the biped robot in the next step is the pose of the next supporting leg of the biped robot when falling after the next movement that is in the original preset motion path of the biped robot. The relative pose between the supporting legs of the biped robot is the falling point of the next supporting leg of the biped robot in the preset ideal supporting pose of the next step, which is relative to the pose at the falling point of the current supporting leg in the current supporting pose. Then, the system calculates the gait parameters of the next step of the biped robot based on the relative pose between the supporting legs of the biped robot and the joint distance of the left and right ankle joints of the biped robot in the initial state (i.e., the standing) of the biped robot. After obtaining the gait parameters of the next step, the system controls the next supporting leg of the biped robot to move according to the gait parameters of the next step, so that the next supporting leg of the biped robot falls on the predetermined falling point. In this embodiment, before the supporting leg of the biped robot falling in the next step, a corresponding calculation is made according to a pre-planned ideal falling point (i.e., the preset ideal supporting pose of the next step) and the current actual falling point, so as to correct the gait parameters of the next step of the biped robot, thereby realizing the error compensation to avoid the falling point of the next supporting leg from deviating from the pre-planned motion path.

Furthermore, the step S1 of obtaining a current supporting pose of a current supporting leg of the two supporting legs of the biped robot includes:

S101: obtaining a centroid pose of a centroid of the biped robot in a global coordinate system and a supporting pose of the current supporting leg in a centroid coordinate system, where the centroid coordinate system is built by taking the centroid of the biped robot as an origin, and the global coordinate system corresponds to an entire environment the biped robot being located.

S102: obtaining the current supporting pose of the current supporting leg in the global coordinate system through a coordinate system transformation based on the supporting pose and the centroid pose.

In this embodiment, the global coordinate system and the centroid coordinate system are built inside the system. In which, the global coordinate system corresponds to the entire environment where the biped robot is currently located, which may use the starting point of the preset motion path of the biped robot as the origin of the coordinate system to represent the positional change of the biped robot in the entire environment when it moves (i.e., the pose of the biped robot in the global coordinate system can represent the position of the biped robot in the entire environment). The centroid coordinate system is a coordinate system built using the centroid of the biped robot as the origin of the coordinate system, where the centroid of the biped robot is the midpoint of a straight line between the two hip joints. The camera is fixed on the biped robot, and the positional relationship between the camera and the centroid of the biped robot is fixed, that is, the coordinate conversion relationship between the two is fixed. Therefore, the system can calculate the pose of the camera in the global coordinate system through the environmental images taken by the camera when the biped robot moves, and then calculate the pose of the centroid in the global coordinate system according to the coordinate conversion relationship between the camera and the centroid of the biped robot, that is, the centroid pose. The kinematic transformations from the centroid of the biped robot to the current supporting leg can be taken as a plurality of links (i.e., the hip joints corresponding to the centroid to the current supporting legs as well as the thigh and calve of the current supporting legs may be simply taken as links) to connect to each other, where the centroid and the current supporting leg are at the two ends of a head and tail link of the biped robot, respectively. The system obtains the positional relationship between the current supporting leg and the centroid through the current angle of each link (the joint of the biped robot), thereby obtaining the supporting pose of the current supporting leg in the centroid coordinate system.

In one embodiment, the system obtains the hip joint angle, knee joint angle, and ankle joint angle of the current supporting leg, and analyze the hip joint angle, knee joint angle, ankle joint angle, the thigh length of the current supporting leg, the calf length of the current supporting leg, and the distance between the two hip joints of the biped robot to obtain the supporting pose of the current supporting leg in the centroid coordinate system. Then, the system obtains the current supporting pose of the current supporting leg in the global coordinate system through coordinate system conversion based on the supporting pose of the current supporting leg in the centroid coordinate system and the centroid pose of the centroid in the global coordinate system.

Furthermore, the centroid is the midpoint of the straight line between the two hip joints two hip joints of the biped robot, and the obtaining the supporting pose of the current supporting leg in the centroid coordinate system includes:

S1011: obtaining a hip joint angle, a knee joint angle, and an ankle joint angle of the current supporting leg.

S1012: analyzing the supporting pose of the current supporting leg in the centroid coordinate system based on the hip joint angle, the knee joint angle, the ankle joint angle, a thigh length of the current supporting leg, a calf length of the current supporting leg, and a distance between the two hip joints of the biped robot.

In this embodiment, the centroid of the biped robot is the midpoint of the straight line between the two hip joints, and the system uses the centroid as the origin of the coordinate system to build the centroid coordinate system in advance. When the biped robot is moved, the system will automatically record the changes of the angle of each joint of the two legs of the biped robot. The system obtains the hip joint angle and the knee joint angle of the current supporting leg automatically, where the current supporting leg includes the thigh and the calf, and the hip joint angle is the included angle between the thigh of the current supporting leg and the hip joint (or the included angle between the thigh and the connection point of the trunk), the knee joint angle is the included angle between the thigh and the calf of the current supporting leg, and the ankle joint angle is the included angle between the calf and the sole of the current supporting leg. Since the origin of the centroid coordinate system is the midpoint of the straight line between the two hip joints, the pose of the hip joint where the current supporting leg is located can be determined according to the distance between the two hip joints of the legs. After obtaining the pose of the hip joint where the current supporting leg is located, the system can obtain the pose of the knee joint in the centroid coordinate system based on the hip joint angle and the thigh length. Furthermore, the system can calculate the pose of the foot of the current supporting leg in the centroid coordinate system based on the knee joint angle, the calf length and the ankle joint, and this pose is the supporting pose. In this embodiment, the lengths of the thigh and the calf can be measured in advance by the developer and stored in the internal database of the system, and can be directly called when needed.

Furthermore, the step S4 of controlling a next supporting leg of the two supporting legs of the biped robot to move according to the one or more gait parameters of the next step includes:

S401: performing an amplitude limiting on the one or more gait parameters of the next step based on one or more preset ideal gait parameters of the next step to obtain one or more modified gait parameters.

S402: controlling the next supporting leg to move according to the one or more modified gait parameters.

In this embodiment, the system can analyze the gait parameters of the next supporting leg of the biped robot in the movement of the next step based on the relative pose between the supporting legs. In order to avoid that there is too much deviation between the calculated value (i.e., the gait parameters of the next step) and the expected value (i.e., the ideal gait parameters, which corresponds to the preset ideal supporting pose of the next step), the system performs an amplitude limiting on the gait parameters of the next step based on the preset ideal supporting pose of the next step to obtain the modified gait parameters. That is, the maximum deviations in the x direction, the y direction and the yaw angle of the next step is given based on the ideal gait parameters of the next step so as to limit the deviations in the above-mentioned directions. For example, in the case that the ideal gait parameter is (4, 5, 15°) and the maximum deviations in the x and y directions are limited to 1 cm and the deviation in the yaw angle is limited to 1°, if the gait parameters of the next step is (2, 6, 18°), the modified gait parameters after the amplitude limiting will be (3, 6, 16°). The system directly controls the next supporting leg of the biped robot to move according to the modified gait parameters. For example, if the modified gait parameters are (3, 6, 16°), the next supporting leg of the biped robot is controlled to move 3 cm in the x direction, move 6 cm in the y direction, and form the included angle of 16° in the x direction.

Furthermore, after the step 401 of performing the amplitude limiting on the one or more gait parameters of the next step based on one or more preset ideal gait parameters of the next step to obtain one or more modified gait parameters, the method further includes:

S4021: determining whether a collision will occur after the next supporting leg moves according to the one or more modified gait parameters.

S4022: correcting the one or more modified gait parameters according to a pose of an object going to collide with the next supporting leg to obtain one or more second modified gait parameters, in response to the collision will occur after the next supporting leg moves according to the one or more modified gait parameters.

S4023: controlling the next supporting leg to move according to the one or more second modified gait parameters to avoid collision.

In this embodiment, after the system obtains the modified gait parameters, it correspondingly obtains the falling point of the next supporting leg of the biped robot in the next step after the amplitude limiting. The system may determine that whether there are other objects (e.g., obstacles or other robots) in the position corresponding to the modified gait parameters in the current environment by shooting using the camera on the biped robot or infrared scanning, so as to determine whether the next supporting leg of the biped robot will collide with other objects after the next supporting leg is moved according to the modified gait parameters. If the system has detected of other objects located in the position corresponding to the modified gait parameters in the current environment, it is determined that there will be a collision after the next supporting leg of the biped robot is moved according to the modified gait parameters. At this time, the system may correct the modified gait parameters again according to the pose of the object that will collide with the next supporting leg, so that the next supporting leg avoids the colliding object at the falling point of the next supporting leg in the next step to obtain second modified gait parameter(s). In one embodiment, the system may correct the modified gait parameters based on the pose of the area occupied by the collision object. For example, if the pose of the area occupied by the colliding object is (4-6, 9-12, 0°), and the modified gait parameters are (5, 10, 16°), it can be corrected to the second modified gait parameters (3, 8, 16°) to avoid the area where the colliding object is located. The system will control the next supporting leg of the biped robot to move according to the second modified gait parameters to avoid collision.

Figure 5:
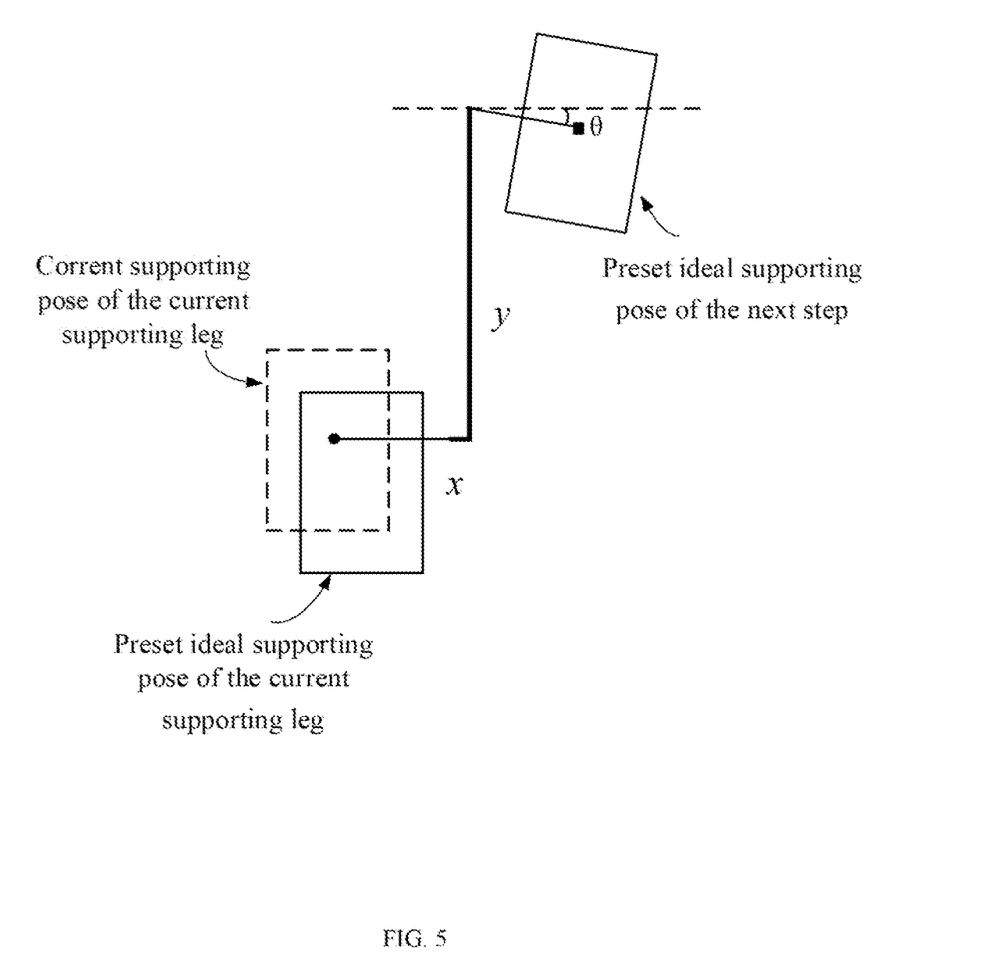
FIG. 5 is a schematic diagram of calculating gait parameters of a next step of the biped robot based on a current supporting pose of a current supporting leg of the biped robot and a preset ideal supporting pose of a next step of the biped robot in the biped robot gait control method shown in FIG. 1 and the gait control shown in FIG. 2.

FIG. 5 is a schematic diagram of calculating gait parameters of a next step of the biped robot based on a current supporting pose of a current supporting leu of the biped robot and a preset ideal supporting pose of a nest step of the biped robot. Furthermore, the gait parameters include a forward displacement, a lateral displacement, and a yaw angle (as shown in x, y and θ in FIG. 5), and the step S2 of calculating the relative pose between the supporting legs of the biped robot based on the current supporting pose and the preset ideal supporting pose of the next step of the biped robot include:

201: substituting the current supporting pose and the preset ideal supporting pose of the next step into first equations to calculate the relative pose between the supporting legs, where the first equations are:

$$x_3 = (x_2 - x_1) \times \cos\theta_1 + (y_2 - y_1) \times \sin\theta_1;$$

and $$\theta_3 = \theta_2 - \theta_1;$$

where $x_1$, $y_1$, and $\theta_1$ represent the current supporting pose, $x_1$ represents a displacement in the x direction of the global coordinate system, $y_1$ represents a displacement in the y direction of the global coordinate system, and $\theta_1$ represents a yaw angle in the y direction of the global coordinate system; $x_2$, $y_2$, and $\theta_2$ represent the preset ideal supporting pose of the next step, $x_2$ represents a displacement in the x direction of the global coordinate system, $y_2$ represents a displacement in the y direction of the global coordinate system, and $\theta_2$ represents a yaw angle in the y direction of the global coordinate system; and $x_3$ is a lateral displacement of the relative pose between the supporting legs, $y_3$ is a forward displacement of the relative pose between the supporting legs, and $\theta_3$ is a yaw angle of the relative pose between the supporting legs.

In this embodiment, in the process of calculating the relative pose between the supporting legs of the biped robot, the system substitutes the current supporting pose and the preset ideal supporting pose of the next step into the first algorithm for calculation. In which, the first algorithm includes three formulas, namely $x_3=(x_2-x_1)\times\cos\theta_1+(y_2-y_1)\times\sin\theta_1$, $y_3=-(x_2-x_1)\times\sin\theta_1+(y_2-y_1)\times\sin\theta_1$, and $\theta_3=\theta_2-\theta_1$. $x_1$, $y_1$, and $\theta_1$ are the coordinates of the current supporting pose, which in turn represent the displacement in the x direction of the global coordinate system, the displacement in the y direction of the global coordinate system, and the yaw angle in the y direction of the global coordinate system. $x_2$, $y_2$, and $\theta_2$ are the coordinates of the preset ideal supporting poses of the next step, which in turn represent the displacement in the x direction of the global coordinate system, the displacement in the y direction of the global coordinate system, and the yaw angle in the y direction of the global coordinate system. $x_3$, $y_3$, and $\theta_3$ are the relative poses between the supporting legs, which in turn represent the lateral displacement, the forward displacement, and the yaw angle of the relative pose between the supporting legs. In this embodiment, based on the current supporting pose and the preset ideal supporting pose of the next step, the relative pose between the next supporting leg of the biped robot after the deviation occurs can be accurately predicted through the first algorithm.

Furthermore, the step S3 of calculating one or more gait parameters of the next step of the biped robot based on the relative pose between the supporting legs and a joint distance of left and right ankle joints of the biped robot in an initial state of the biped robot includes:

S301: identifying whether the current supporting leg is a right foot of the two supporting legs.

S302: substituting the relative pose between the supporting legs and the joint distance into second equations to calculate the one or more gait parameters of the next step in response to the current supporting leg being the right foot, where the second equations are:

$x_4=x_3-a/2\times\sin\theta_3$;

$y_4=y_3+a/2\times(1+\cos\theta_3)$; and $\theta_4=\theta_3$;

where, $x_4$ is a lateral displacement of the one or more gait parameters of the next step, $y_4$ is a forward displacement of the one or more gait parameters of the next step, and $\theta_4$ is a yaw angle of the one or more gait parameters of the next step, and a is the joint distance.

S303: substituting the relative pose between the supporting legs and the joint distance into third equations to calculate the one or more gait parameters of the next step in response to the current supporting leg being not the left foot, where the third equations are:

$x_4=x_3+a/2\times\sin\theta_3$;

$y_4=y_3-a/2\times(1+\cos\theta_3)$; and $\theta_4=\theta_3$.

In this embodiment, the system predicts the corresponding gait parameters (i.e., the gait parameters of the next step) of the next supporting leg of the biped robot in the movement of the next step using the second algorithm or the third algorithm based on the relative pose between the supporting legs and the joint distance of the left and right ankle joints when the biped robot is in the initial state. In one embodiment, the system first identifies whether the current supporting leg of the biped robot is the right leg. If the current supporting leg is the right leg, the second algorithm is called, and the relative pose between the supporting legs and joint distance are substituted into the second algorithm for calculation. In which, the second algorithm includes three formulas of $x_4=x_3-a/2\times\sin\theta_3$, $y_4=y_3+a/2\times(1+\cos\theta_3)$, and $\theta_4=\theta_3$, where $x_4$, $y_4$, $\theta_4$ are the gait parameters of the next step, a is the joint distance (the value of the joint distance can be measured in advance by the developer and then entered into the database of the system for storage). Otherwise, if the current supporting leg is the left leg, the system calls the third algorithm, and substitutes the relative pose between the supporting legs and the joint distance into the third algorithm for calculation. In which, the third algorithm includes three calculation formulas of $x_4=x_3+a/2\times\sin\theta_3$, $y_4=y_3-a/2\times(1+\cos\theta_3)$, and $\theta_4=\theta_3$. In this embodiment, based on the relative pose between the supporting legs and the joint distance of the biped robot that are calculated in the previous step and joint distance, the system can compensate the error of the gait parameters of each step of the biped robot through the calculation of the second algorithm or the third algorithm, so as to avoid the error of the navigation data from having a greater impact on the movement of the biped robot, and avoid the deviation of the preset path caused by the movement error.

Figure 2:
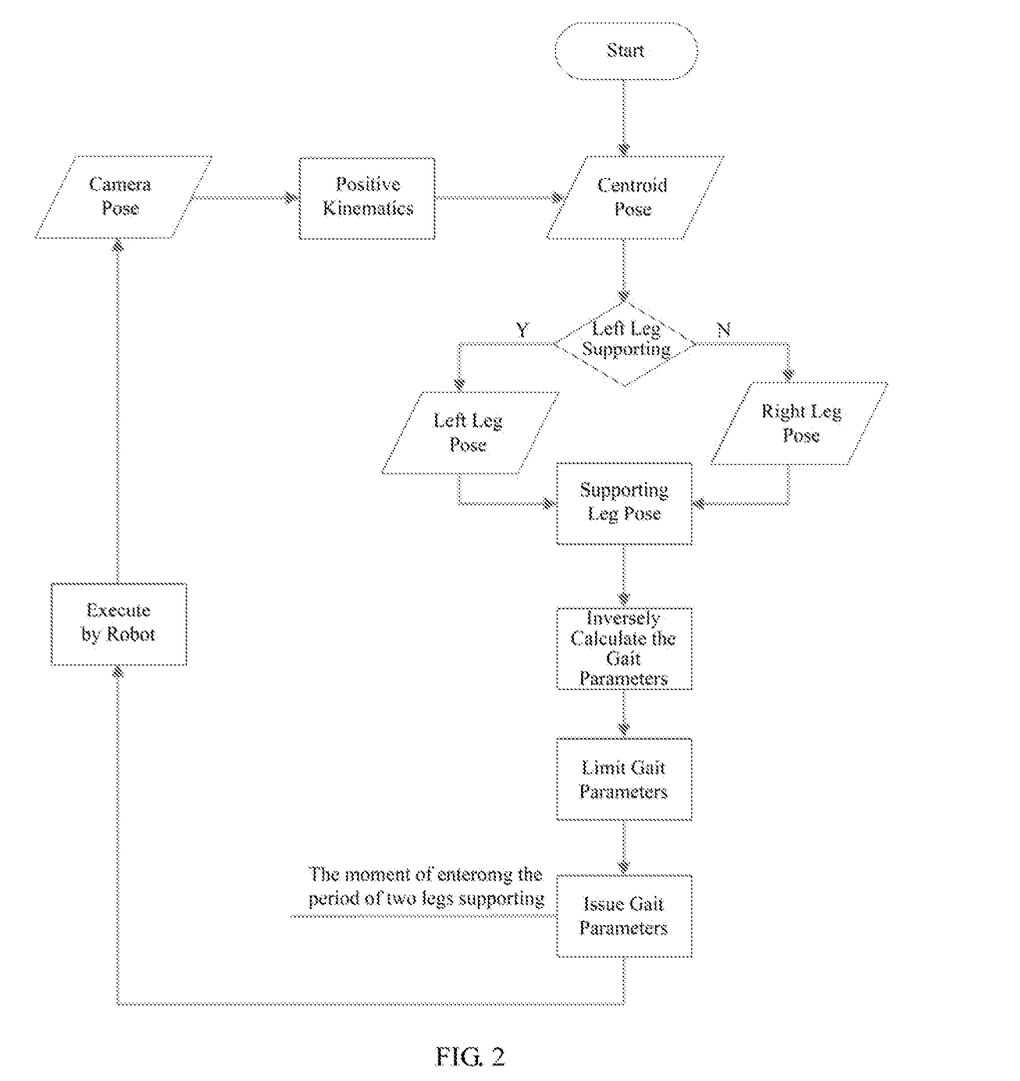
FIG. 2 is a flow chart of a gait control in the entirety of the movement of a biped robot according to an embodiment of the present disclosure.

FIG. 2 is a flow chart of a gait control in the entirety of the movement of a biped robot according to an embodiment of the present disclosure. As shown in FIG. 2, in this embodiment, the entire process of the movement of the biped robot includes: the system calculating in real time to obtain the pose of the camera of the biped robot in the global coordinate system, and to calculate the pose of the centroid of the biped robot in the global coordinate system through coordinate system transformation. The system obtains the current supporting pose of the current supporting leg through kinematics at the moment of the leg falling of the biped robot, and then determines whether the current supporting leg of the biped robot is the left leg or the right leg in real time, thereby identifying that whether the leg going to fall (i.e., the next supporting leg) in the next step of the biped robot is the right leg or the left leg, so as to call the corresponding algorithm to calculate the relative pose between the supporting legs of the biped robot. The system inversely calculates the corresponding gait parameters (i.e., the gait parameters of the next step) of the next supporting leg in the next step based on the relative pose between the supporting legs, and limits the gait parameters of the next step to obtain the modified gait parameters. The system issues the modified gait parameters at the moment when the biped robot enters the period of two legs supporting, so as to ensure that the parameters required by the robot when it raises its legs have been set, so that the next supporting leg of the biped robot can move according to the issued gait parameters. During the movement of the biped robot, the system iteratively performs the above-mentioned steps, so as to realize the error compensation to the movement parameters of each step of the biped robot.

In this embodiment, in the provided gait control method of the biped robot, during the movement, the system obtains the current supporting pose of the current supporting leg of the biped robot, and then calculate the relative pose between the supporting legs of the biped robot based on the current supporting pose and the preset ideal supporting pose of the next step of the biped robot. Then, the system calculates the gait parameters of the next step of the biped robot based on the relative pose between the supporting legs and the joint distance of the left and right ankle joints of the biped robot in the initial state. Finally, the system controls the next supporting leg of the biped robot to move according to the gait parameters of the next step. During the movement, the system monitors the falling point (i.e., the current supporting pose of the current supporting leg) of the biped robot in real time, and adjusts the gait parameters of the next step of the biped robot using the preset algorithm accordingly, so as to realize the real time correction of the gait parameters of the biped robot to avoid the deviation of the preset path caused by the movement error, thereby ensuring the coordination of the team of robots during movement and their consistency on the timeline.

Figure 3:
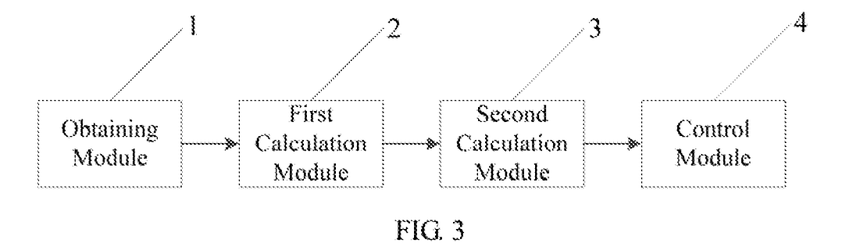
FIG. 3 is a schematic block diagram of a biped robot gait control apparatus according to an embodiment of the present disclosure.

FIG. 3 is a schematic block diagram of a biped robot gait control apparatus according to an embodiment of the present disclosure. In this embodiment, the method may be implemented through a robot shown in FIG. 4. As shown in FIG. 3, the apparatus includes:
  an obtaining module 1 configured to obtain a current supporting pose of a current supporting leg of the two supporting legs of the biped robot;
  a first calculation module 2 configured to calculate a relative pose between the supporting legs of the biped robot based on the current supporting pose and a preset ideal supporting pose of a next step of the biped robot, where the relative pose between the support feet is the preset ideal supporting pose of the next step with respect to the current supporting pose;
  a second calculation module 3 configured to calculate one or more gait parameters of the next step of the biped robot based on the relative pose between the supporting legs and a joint distance of left and right ankle joints of the biped robot in an initial state of the biped robot; and
  a control module 4 configured to control a next supporting leg of the two supporting legs of the biped robot to move according to the one or more gait parameters of the next step.

Furthermore, the obtaining module 1 includes:
  an obtaining unit configured to obtain a centroid pose of a centroid of the biped robot in a global coordinate system and a supporting pose of the current supporting leg in a centroid coordinate system, where the centroid coordinate system is built by taking the centroid of the biped robot as an origin, and the global coordinate system corresponds to an entire environment the biped robot being located; and
  a transformation unit configured to obtain the current supporting pose of the current supporting leg in the global coordinate system through a coordinate system transformation based on the supporting pose and the centroid pose.

The centroid is a midpoint of a straight line between two hip joints of the biped robot, and the obtaining unit includes:
  an obtaining subunit configured to obtain a hip joint angle, a knee joint angle, and an ankle joint angle of the current supporting leg; and
  an analysis subunit configured to analyze the supporting pose of the current supporting leg in the centroid coordinate system based on the hip joint angle, the knee joint angle, the ankle joint angle, a thigh length of the current supporting leg, a calf length of the current supporting leg, and a distance between the two hip joints of the biped robot.

Furthermore, the control module 4 includes:
  a limiting unit configured to perform an amplitude limiting on the one or more gait parameters of the next step based on one or more preset ideal gait parameters of the next step to obtain one or more modified gait parameters; and
  a first control unit configured to control the next supporting leg to move according to the one or more modified gait parameters.

Furthermore, the control module 4 further includes:
  a determination unit configured to determine whether a collision will occur after the next supporting leg moves according to the one or more modified gait parameters;
  a correction unit configured to correct the one or more modified gait parameters according to a pose of an object going to collide with the next supporting leg to obtain one or more second modified gait parameters, in response to the collision will occur after the next supporting leg moves according to the one or more modified gait parameters; and
  a second control unit configured to control the next supporting leg to move according to the one or more second modified gait parameters to avoid collision.

Furthermore, the one or more gait parameters include a forward displacement, a lateral displacement, and a yaw angle, and the first calculation module 2 includes:
  a first calculation unit configured to substitute the current supporting pose and the preset ideal supporting pose of the next step into first equations to calculate the relative pose between the supporting legs, where the first equations are:

$$x_3 = (x_2 - x_1) \times \cos\theta_1 + (y_2 - y_1) \times \sin\theta_1;$$

and $$\theta_3 = \theta_2 - \theta_1;$$

where $x_1$, $y_1$, and $\theta_1$ represent the current supporting pose, $x_1$ represents a displacement in the x direction of a global coordinate system, $y_1$ represents a displacement in the y direction of the global coordinate system, and $\theta_1$ represents a yaw angle in the y direction of the global coordinate system; $x_2$, $y_2$, and $\theta_2$ represent the preset ideal supporting pose of the next step, $x_2$ represents a displacement in the x direction of the global coordinate system, $y_2$ represents a displacement in the y direction of the global coordinate system, and $\theta_2$ represents a yaw angle in the y direction of the global coordinate system; and $x_3$ is a lateral displacement of the relative pose between the supporting legs, $y_3$ is a forward displacement of the relative pose between the supporting legs, and $\theta_3$ is a yaw angle of the relative pose between the supporting legs.

Furthermore, the second calculation module 3 includes:

an identification unit configured to identify whether the current supporting leg is a right foot of the two supporting legs;

a second calculation unit configured to substitute the relative pose between the supporting legs and the joint distance into second equations to calculate the one or more gait parameters of the next step in response to the current supporting leg being the right foot, where the second equations are:

$$x_4 = x_3 - a/2 \times \sin\theta_3;$$

$$y_4 = y_3 + a/2 \times (1 + \cos\theta_3); \text{ and}$$

$$\theta_4 = \theta_3;$$

where, $x_4$ is a lateral displacement of the one or more gait parameters of the next step, $y_4$ is a forward displacement of the one or more gait parameters of the next step, and $\theta_4$ is a yaw angle of the one or more gait parameters of the next step, and a is the joint distance; and a third calculation unit configured to substitute the relative pose between the supporting legs and the joint distance into third equations to calculate the one or more gait parameters of the next step in response to the current supporting leg being not the left foot, where the third equations are:

$$x_4 = x_3 + a/2 \times \sin\theta_3;$$

$$y_4 = y_3 - a/2 \times (1 + \cos\theta_3); \text{ and}$$

$$\theta_4 = \theta_3.$$

In this embodiment, each module, unit, and subunit of the gait control apparatus is for executing each step in the above-mentioned gait correction method for the biped robot, which will not be described in detail herein.

In this embodiment, in the provided gait control apparatus of the biped robot, during the movement, the system obtains the current supporting pose of the current supporting leg of the biped robot, and then calculate the relative pose between the supporting legs of the biped robot based on the current supporting pose and the preset ideal supporting pose of the next step of the biped robot. Then, the system calculates the gait parameters of the next step of the biped robot based on the relative pose between the supporting legs and the joint distance of the left and right ankle joints of the biped robot in the initial state. Finally, the system controls the next supporting leg of the biped robot to move according to the gait parameters of the next step. During the movement, the system monitors the falling point (i.e., the current supporting pose of the current supporting leg) of the biped robot in real time, and adjusts the gait parameters of the next step of the biped robot using the preset algorithm accordingly, so as to realize the real time correction of the gait parameters of the biped robot to avoid the deviation of the preset path caused by the movement error, thereby ensuring the coordination of the team of robots during movement and their consistency on the timeline.

Figure 4:
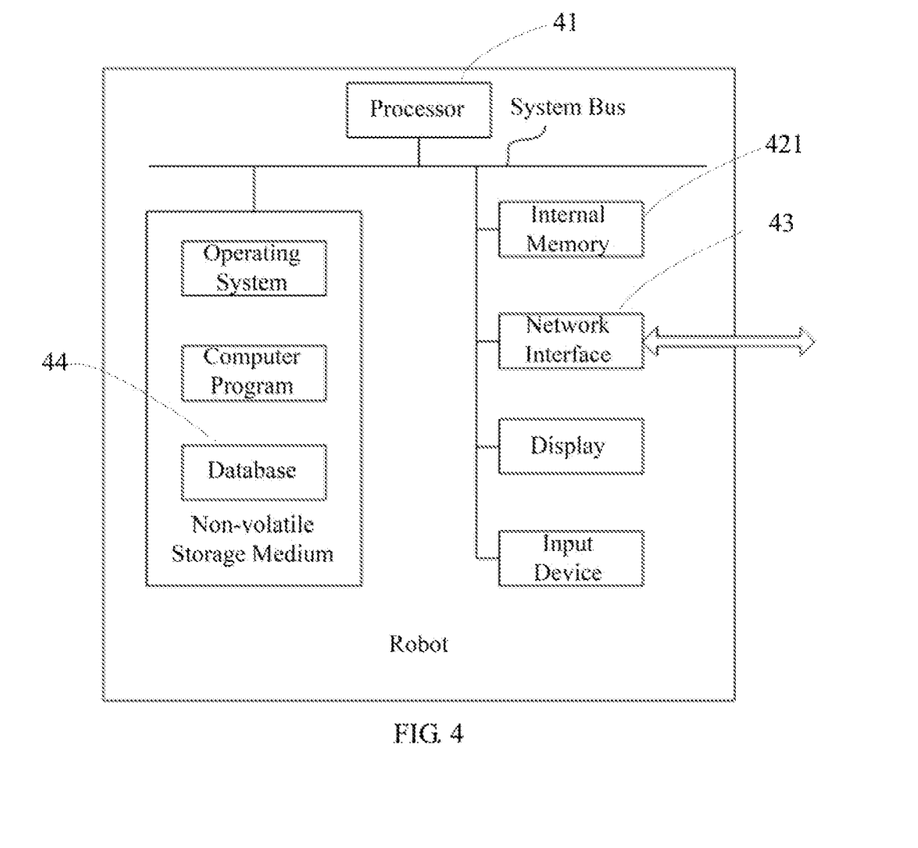
FIG. 4 is a schematic block diagram of a robot according to an embodiment of the present disclosure.

FIG. 4 is a schematic block diagram of a robot according to an embodiment of the present disclosure. A computing device is provided. The computer device may be a server. As shown in FIG. 4, the computing device includes a processor 41, a storage, a network interface 43, and a database 44 which are connected via a system bus. In which, the processor 41 is for realizing calculations and controls. The storage includes a non-volatile storage medium and an internal memory 421. The non-volatile storage medium stores an operating system, a computer program, and the database 44. The internal memory 421 provides an environment for the execution of the operating system and computer program in the non-volatile storage medium. The database 44 is for storing the first algorithm and other data. The network interface 43 is for connecting and communicating with an external terminal via a network. When the computer program is executed by the processor 61, the above-mentioned biped robot gait control method is implemented.

The steps of the above-mentioned target object detection model training method that are executed by the processor include:

S1: obtaining a current supporting pose of a current supporting leg of the two supporting legs of the biped robot.

S2: calculating a relative pose between the supporting legs of the biped robot based on the current supporting pose and a preset ideal supporting pose of a next step of the biped robot, where the relative pose between the support feet is the preset ideal supporting pose of the next step with respect to the current supporting pose.

S3: calculating one or more gait parameters of the next step of the biped robot based on the relative pose between the supporting legs and a joint distance of left and right ankle joints of the biped robot in an initial state of the biped robot.

S4: controlling a next supporting leg of the two supporting legs of the biped robot to move according to the one or more gait parameters of the next step.

Furthermore, the step S1 of obtaining a current supporting pose of a current supporting leg of the two supporting legs of the biped robot includes:

S101: obtaining a centroid pose of a centroid of the biped robot in a global coordinate system and a supporting pose of the current supporting leg in a centroid coordinate system, where the centroid coordinate system is built by taking the centroid of the biped robot as an origin, and the global coordinate system corresponds to an entire environment the biped robot being located.

S102: obtaining the current supporting pose of the current supporting leg in the global coordinate system through a coordinate system transformation based on the supporting pose and the centroid pose.

Furthermore, the centroid is a midpoint of a straight line between the two hip joints two hip joints of the biped robot, and the obtaining the supporting pose of the current supporting leg in the centroid coordinate system includes:

S1011: obtaining a hip joint angle, a knee joint angle, and an ankle joint angle of the current supporting leg.

S1012: analyzing the supporting pose of the current supporting leg in the centroid coordinate system based on the hip joint angle, the knee joint angle, the ankle joint angle, a thigh length of the current supporting leg, a calf length of the current supporting leg, and a distance between the two hip joints of the biped robot.

Furthermore, the step S4 of controlling a next supporting leg of the two supporting legs of the biped robot to move according to the one or more gait parameters of the next step includes:

S401: performing an amplitude limiting on the one or more gait parameters of the next step based on one or more preset ideal gait parameters of the next step to obtain one or more modified gait parameters.

S402: controlling the next supporting leg to move according to the one or more modified gait parameters.

Furthermore, after the step 401 of performing the amplitude limiting on the one or more gait parameters of the next step based on one or more preset ideal gait parameters of the next step to obtain one or more modified gait parameters, the method further includes:

S4021: determining whether a collision will occur after the next supporting leg moves according to the one or more modified gait parameters.

S4022: correcting the one or more modified gait parameters according to a pose of an object going to collide with the next supporting leg to obtain one or more second modified gait parameters, in response to the collision will occur after the next supporting leg moves according to the one or more modified gait parameters.

S4023: controlling the next supporting leg to move according to the one or more second modified gait parameters to avoid collision.

Furthermore, the gait parameters include a forward displacement, a lateral displacement, and a yaw angle, and the step S2 of calculating the relative pose between the supporting legs of the biped robot based on the current supporting pose and the preset ideal supporting pose of the next step of the biped robot include:

S201: substituting the current supporting pose and the preset ideal supporting pose of the next step into first equations to calculate the relative pose between the supporting legs, where the first equations are:

$$x_3=(x_2-x_1)\times\cos\theta_1+(y_2-y_1)\times\sin\theta_1;$$

$$y_3=-(x_2-x_1)\times\sin\theta_1+(y_2-y_1)\times\sin\theta_1; \text{ and}$$

$$\theta_3=\theta_2-\theta_1;$$

where $x_1$, $y_1$, and $\theta_1$ represent the current supporting pose, $x_1$ represents a displacement in the x direction of the global coordinate system, $y_1$ represents a displacement in the y direction of the global coordinate system, and $\theta_1$ represents a yaw angle in the y direction of the global coordinate system; $x_2$, $y_2$, and $\theta_2$ represent the preset ideal supporting pose of the next step, $x_2$ represents a displacement in the x direction of the global coordinate system, $y_2$ represents a displacement in the y direction of the global coordinate system, and $\theta_2$ represents a yaw angle in the y direction of the global coordinate system; and $x_3$ is a lateral displacement of the relative pose between the supporting legs, $y_3$ is a forward displacement of the relative pose between the supporting legs, and $\theta_3$ is a yaw angle of the relative pose between the supporting legs.

Furthermore, the step S3 of calculating one or more gait parameters of the next step of the biped robot based on the relative pose between the supporting legs and a joint distance of left and right ankle joints of the biped robot in an initial state of the biped robot includes:

S301: identifying whether the current supporting leg is a right foot of the two supporting legs.

S302: substituting the relative pose between the supporting legs and the joint distance into second equations to calculate the one or more gait parameters of the next step in response to the current supporting leg being the right foot, where the second equations are:

$$x_4=x_3-\alpha/2\times\sin\theta_3;$$

$$y_4=y_3+\alpha/2\times(1+\cos\theta_3); \text{ and}$$

$$\theta_4=\theta_3;$$

where, $x_4$ is a lateral displacement of the one or more gait parameters of the next step, $y_4$ is a forward displacement of the one or more gait parameters of the next step, and $\theta_4$ is a yaw angle of the one or more gait parameters of the next step, and a is the joint distance.

S303: substituting the relative pose between the supporting legs and the joint distance into third equations to calculate the one or more gait parameters of the next step in response to the current supporting leg being not the left foot, where the third equations are:

$$x_4=x_3+\alpha/2\times\sin\theta_3;$$

$$y_4=y_3-\alpha/2\times(1+\cos\theta_3); \text{ and}$$

$$\theta_4=\theta_3.$$

The present disclosure further provides a non-transitory computer readable storage medium storing a computer program. When the computer program is executed by a processor, the above-mentioned biped robot gait control method is implemented. The biped robot gait control method includes:

S1: obtaining a current supporting pose of a current supporting leg of the two supporting legs of the biped robot.

S2: calculating a relative pose between the supporting legs of the biped robot based on the current supporting pose and a preset ideal supporting pose of a next step of the biped robot, where the relative pose between the support feet is the preset ideal supporting pose of the next step with respect to the current supporting pose.

S3: calculating one or more gait parameters of the next step of the biped robot based on the relative pose between the supporting legs and a joint distance of left and right ankle joints of the biped robot in an initial state of the biped robot.

S4: controlling a next supporting leg of the two supporting legs of the biped robot to move according to the one or more gait parameters of the next step.

Furthermore, the step S1 of obtaining a current supporting pose of a current supporting leg of the two supporting legs of the biped robot includes:

S101: obtaining a centroid pose of a centroid of the biped robot in a global coordinate system and a supporting pose of the current supporting leg in a centroid coordinate system, where the centroid coordinate system is built by taking the centroid of the biped robot as an origin, and the global coordinate system corresponds to an entire environment the biped robot being located.

S102: obtaining the current supporting pose of the current supporting leg in the global coordinate system through a coordinate system transformation based on the supporting pose and the centroid pose.

Furthermore, the centroid is a midpoint of a straight line between the two hip joints two hip joints of the biped robot, and the obtaining the supporting pose of the current supporting leg in the centroid coordinate system includes:

S1011: obtaining a hip joint angle, a knee joint angle, and an ankle joint angle of the current supporting leg.

S1012: analyzing the supporting pose of the current supporting leg in the centroid coordinate system based on the hip joint angle, the knee joint angle, the ankle joint angle, a thigh length of the current supporting leg, a calf length of the current supporting leg, and a distance between the two hip joints of the biped robot.

Furthermore, the step S4 of controlling a next supporting leg of the two supporting legs of the biped robot to move according to the one or more gait parameters of the next step includes:

S401: performing an amplitude limiting on the one or more gait parameters of the next step based on one or more preset ideal gait parameters of the next step to obtain one or more modified gait parameters.

S402: controlling the next supporting leg to move according to the one or more modified gait parameters.

Furthermore, after the step 401 of performing the amplitude limiting on the one or more gait parameters of the next step based on one or more preset ideal gait parameters of the next step to obtain one or more modified gait parameters, the method further includes:

S4021: determining whether a collision will occur after the next supporting leg moves according to the one or more modified gait parameters.

S4022: correcting the one or more modified gait parameters according to a pose of an object going to collide with the next supporting leg to obtain one or more second modified gait parameters, in response to the collision will occur after the next supporting leg moves according to the one or more modified gait parameters.

S4023: controlling the next supporting leg to move according to the one or more second modified gait parameters to avoid collision.

Furthermore, the gait parameters include a forward displacement, a lateral displacement, and a yaw angle, and the step S2 of calculating the relative pose between the supporting legs of the biped robot based on the current supporting pose and the preset ideal supporting pose of the next step of the biped robot include:

S201: substituting the current supporting pose and the preset ideal supporting pose of the next step into first equations to calculate the relative pose between the supporting legs, where the first equations are:

$$x_3=(x_2-x_1)\times\cos\theta_1+(y_2-y_1)\times\sin\theta_1;$$

$$y_3=-(x_2-x_1)\times\sin\theta_1+(y_2-y_1)\times\sin\theta_1;\text{ and}$$

$$\theta_3=\theta_2-\theta_1;$$

where $x_1$, $y_1$, and $\theta_1$ represent the current supporting pose, $x_1$ represents a displacement in the x direction of the global coordinate system, $y_1$ represents a displacement in the y direction of the global coordinate system, and $\theta_1$ represents a yaw angle in the y direction of the global coordinate system; $x_2$, $y_2$, and $\theta_2$ represent the preset ideal supporting pose of the next step, $x_2$ represents a displacement in the x direction of the global coordinate system, $y_2$ represents a displacement in the y direction of the global coordinate system, and $\theta_2$ represents a yaw angle in the y direction of the global coordinate system; and $x_3$ is a lateral displacement of the relative pose between the supporting legs, $y_3$ is a forward displacement of the relative pose between the supporting legs, and $\theta_3$ is a yaw angle of the relative pose between the supporting legs.

Furthermore, the step S3 of calculating one or more gait parameters of the next step of the biped robot based on the relative pose between the supporting legs and a joint distance of left and right ankle joints of the biped robot in an initial state of the biped robot includes:

S301: identifying whether the current supporting leg is a right foot of the two supporting legs.

S302: substituting the relative pose between the supporting legs and the joint distance into second equations to calculate the one or more gait parameters of the next step in response to the current supporting leg being the right foot, where the second equations are:

$$x_4=x_3-\alpha/2\times\sin\theta_3;$$

$$y_4=y_3+\alpha/2\times(1+\cos\theta_3);\text{ and}$$

$$\theta_4=\theta_3;$$

where, $x_4$ is a lateral displacement of the one or more gait parameters of the next step, $y_4$ is a forward displacement of the one or more gait parameters of the next step, and $\theta_4$ is a yaw angle of the one or more gait parameters of the next step, and a is the joint distance.

S303: substituting the relative pose between the supporting legs and the joint distance into third equations to calculate the one or more gait parameters of the next step in response to the current supporting leg being not the left foot, where the third equations are:

$$x_4=x_3+\alpha/2\times\sin\theta_3;$$

$$y_4=y_3-\alpha/2\times(1+\cos\theta_3);\text{ and}$$

$$\theta_4=\theta_3.$$

It can be understood by those skilled in the art that, all or part of the process of the method of the above-mentioned embodiment can be implemented by a computer program to instruct related hardware. The program can be stored in a non-volatile computer readable storage medium. When the program is executed, which can include the process of each method embodiment as described above. In which, any reference to a storage, a memory, a database or other medium used in each embodiment provided by the present disclosure may include non-volatile and/or volatile memory. Non-volatile memory can include read only memory (ROM), programmable ROM (PROM), electrically programmable ROM (EPROM), electrically erasable programmable ROM (EEPROM), or flash memory. Volatile memory can include random access memory (RAM) or external cache memory. As a description rather than a limitation, RAM can be in a variety of formats such as static RAM (SRAM), dynamic RAM (DRAM), synchronous DRAM (SDRAM), double data rate SDRAM (DDRSDRAM), enhanced SDRAM (ESDRAM), synchronous link DRAM (SLDRAM), rambus direct RAM (RDRAM), direct rambus DRAM (DRDRAM), and rambus DRAM (RDRAM).

It should be noted that, in the present disclosure, the terms "include", "comprise" or any other variants thereof are intended to cover non-exclusive inclusion, so that a process, apparatus (or device), article or method including a series of elements not only includes those elements but also includes other elements that are not explicitly listed, or further includes elements inherent to the process, apparatus, article, or method. If there are no more restrictions, the element defined by the sentence "including a . . . " does not exclude the existence of other identical elements in the process, apparatus, article, or method that includes the element.

The forgoing descriptions are only the embodiments of the present disclosure, while do not limit the scope of this present disclosure. Any equivalent structure or equivalent process transformation made using the content of the description and drawings of the present disclosure, or directly or indirectly applying the embodiments to other related technology is similarly included in the scope of the present disclosure.

What is claimed is:

1. A computer-implemented gait control method for a biped robot having two supporting legs, comprising steps of:
obtaining, by a camera on the biped robot, a current supporting pose of a current supporting leg of the two supporting legs of the biped robot in a global coordinate system, wherein the biped robot is moved according to a preset motion path in an entire environment, and a starting point of the motion path is taken as an origin of the global coordinate system;

calculating a relative pose between the two supporting legs of the biped robot based on the current supporting pose and a preset ideal supporting pose of a next step of the biped robot, wherein the relative pose between the two supporting legs is the preset ideal supporting pose of the next step with respect to the current supporting pose;

calculating one or more gait parameters of the next step of the biped robot based on the relative pose between the supporting legs and a joint distance of left and right ankle joints of the biped robot in an initial state of the biped robot; and controlling a next supporting leg of the two supporting legs of the biped robot to move according to the one or more gait parameters of the next step.

2. The method of claim 1, wherein the obtaining, by the camera on the biped robot, the current supporting pose of the current supporting leg of the two supporting legs of the biped robot in the global coordinate system comprises:

capturing, by the camera, an image of an environment, and calculating a pose of the camera in the global coordinate system;

obtaining a centroid pose of a centroid of the biped robot in the global coordinate system base on a coordinate conversion relationship between the camera and the centroid of the biped robot and the pose of the camera, and obtaining a supporting pose of the current supporting leg in a centroid coordinate system, wherein the centroid coordinate system is built by taking the centroid of the biped robot as an origin of the centroid coordinate system, the global coordinate system corresponds to the entire environment the biped robot being located, and the preset motion path is represented by corresponding coordinates of points in the global coordinate system; and obtaining the current supporting pose of the current supporting leg in the global coordinate system through a coordinate system transformation based on the supporting pose and the centroid pose.

3. The method of claim 2, wherein the centroid is a midpoint of a straight line between two hip joints of the biped robot, and the obtaining the supporting pose of the current supporting leg in the centroid coordinate system comprises:

obtaining a hip joint angle, a knee joint angle, and an ankle joint angle of the current supporting leg, wherein the hip joint angle is an included angle between a thigh of the current supporting leg and the hip joint, the knee joint angle is an included angle between the thigh and a calf of the current supporting leg, and the ankle joint angle is an included angle between the calf and a sole of the current supporting leg; and analyzing the supporting pose of the current supporting leg in the centroid coordinate system based on the hip joint angle, the knee joint angle, the ankle joint angle, a thigh length of the current supporting leg, a calf length of the current supporting leg, and a distance between the two hip joints of the biped robot.

4. The method of claim 1, wherein the controlling the next supporting leg of the two supporting legs of the biped robot to move according to the one or more gait parameters of the next step comprises:

performing an amplitude limiting on the one or more gait parameters of the next step based on one or more preset ideal gait parameters of the next step to obtain one or more modified gait parameters; and controlling the next supporting leg to move according to the one or more modified gait parameters.

5. The method of claim 4, wherein after the performing the amplitude limiting on the one or more gait parameters of the next step based on the one or more preset ideal gait parameters of the next step to obtain the one or more modified gait parameters, further comprising steps of:

determining whether a collision will occur after the next supporting leg moves according to the one or more modified gait parameters;

correcting the one or more modified gait parameters according to a pose of an object going to collide with the next supporting leg to obtain one or more second modified gait parameters, in response to the collision will occur after the next supporting leg moves according to the one or more modified gait parameters; and controlling the next supporting leg to move according to the one or more second modified gait parameters to avoid collision.

6. The method of claim 4, wherein the one or more gait parameters comprise a forward displacement, a lateral displacement, and a yaw angle, and the calculating the relative pose between the supporting legs of the biped robot based on the current supporting pose and the preset ideal supporting pose of the next step of the biped robot comprises:

substituting the current supporting pose and the preset ideal supporting pose of the next step into first equations to calculate the relative pose between the supporting legs, wherein the first equations are:

$$x_3 = (x_2 - x_1) \times \cos \theta_1 + (y_2 - y_1) \times \sin \theta_1;$$

and $$\theta_3 = \theta_2 - \theta_1;$$

where $x_1$, $y_1$, $\theta_1$ represent the current supporting pose, $x_1$ represents a displacement in the x direction of a global coordinate system, $y_1$ represents a displacement in the y direction of the global coordinate system, and $\theta_1$ represents a yaw angle; $x_2$, $y_2$, and $\theta_2$ represent the preset ideal supporting pose of the next step, $x_2$ represents a displacement in the x direction of the global coordinate system, $y_2$ represents a displacement in the y direction of the global coordinate system, and $\theta_2$ represents a yaw angle; and $x_3$ is a lateral displacement of the relative pose between the supporting legs, $y_3$ is a forward displacement of the relative pose between the supporting legs, and $\theta_3$ is a yaw angle of the relative pose between the supporting legs.

7. The method of claim 6, wherein the calculating the one or more gait parameters of the next step of the biped robot based on the relative pose between the supporting legs and the joint distance of the left and right ankle joints of the biped robot in the initial state of the biped robot comprises:

identifying whether the current supporting leg is a right foot of the two supporting legs;

substituting the relative pose between the supporting legs and the joint distance into second equations to calculate the one or more gait parameters of the next step in response to the current supporting leg being the right foot, wherein the second equations are:

$$x_4 = x_3 - \alpha/2 \times \sin\theta_3;$$

$$y_4 = y_3 - \alpha/2 \times (1 + \cos\theta_3); \text{ and}$$

$$\theta_4 = \theta_3;$$

where, $x_4$ is a lateral displacement of the one or more gait parameters of the next step, $y_4$ is a forward displacement of the one or more parameters of the next step, and $\theta_4$ is a yaw angle of the one or more gait parameters of the next step, and $\alpha$ is the joint distance; and substituting the relative pose between the supporting legs and the joint distance into third equations to calculate the one or more gait parameters of the next step in response to the current supporting leg being not the left foot, wherein the third equations are:

$$x_4 = x_3 - \alpha/2 \times \sin\theta_3;$$

$$y_4 = y_3 - \alpha/2 \times (1 + \cos\theta_3); \text{ and}$$

$$\theta_4 = \theta_3;$$

8. A robot comprising:
a processor;
a camera coupled to the processor;
a memory coupled to the processor; and
one or more computer programs stored in the memory and executable on the processor;
wherein, the one or more computer programs comprise:
instructions for obtaining, by the camera, a current supporting pose of a current supporting leg of the two supporting legs of the biped robot in a global coordinate system, wherein the biped robot is moved according to a preset motion path in an entire environment, and a starting point of the motion path is taken as an origin of the global coordinate system;
instructions for calculating a relative pose between the two supporting legs of the biped robot based on the current supporting pose and a preset ideal supporting pose of a next step of the biped robot, wherein the relative pose between the two supporting legs is the preset ideal supporting pose of the next step with respect to the current supporting pose;
instructions for calculating one or more gait parameters of the next step of the biped robot based on the relative pose between the supporting legs and a joint distance of left and right ankle joints of the biped robot in an initial state of die biped robot; and
instructions for controlling a next supporting leg of the two supporting legs of the biped robot to move according to the one or more gait parameters of the next step.

9. The robot of claim 8, wherein the instructions for obtaining the current supporting pose of the current supporting leg of the two supporting legs of the biped robot comprise:
instructions for obtaining a centroid pose of a centroid of the biped robot in the global coordinate system and a supporting pose of the current supporting leg in a centroid coordinate system, wherein the centroid coordinate system is built by taking the centroid of the biped robot as an origin of the centroid coordinate system, and the global coordinate system corresponds to the entire environment the biped robot being located; and
instructions for obtaining the current supporting pose of the current supporting leg in the global coordinate system through a coordinate system transformation based on the supporting pose and the centroid pose.

10. The robot of claim 9, wherein the centroid is a midpoint of a straight line between two hip joints of the biped robot, and the instructions for obtaining the supporting pose of the current supporting leg in the centroid coordinate system comprise:
instructions for obtaining a hip joint angle, a knee joint angle, and an ankle joint angle of the current supporting leg; and
instructions for analyzing the supporting pose of the current supporting leg in the centroid coordinate system based on the hip joint angle, the knee joint angle, the ankle joint angle, a thigh length of the current supporting leg, a calf length of the current supporting leg, and a distance between the two hip joints of the biped robot.

11. The robot of claim 8, wherein the instructions for controlling the next supporting leg of the two supporting legs of the biped robot to move according to the one or more gait parameters of the next step comprise:
instructions for performing an amplitude limiting on the one or more gait parameters of the next step based on one or more preset ideal gait parameters of the next step to obtain one or more modified gait parameters; and
instructions for controlling the next supporting leg to move according to the one or more modified gait parameters.

12. The robot of claim 11, wherein the one or more computer programs further comprise:
instructions for determining whether a collision will occur after the next supporting leg moves according to the one or more modified gait parameters;
instructions for correcting the one or more modified gait parameters according to a pose of an object going to collide with the next supporting leg to obtain one or more second modified gait parameters, in response to the collision will occur after the next: supporting leg moves according to the one or more modified gait parameters; and
instructions for controlling, the next supporting leg to move according to the one or more second modified gait parameters to avoid collision.

13. The robot of claim 11, wherein the one or more gait parameters comprise a forward displacement, a lateral displacement, and a yaw angle, and the instructions for calculating the relative pose between the supporting legs of the biped robot based on the current supporting pose and the preset ideal supporting pose of the next step of the biped robot comprise:
instructions for substituting the current supporting pose and the preset ideal supporting pose of the next step into first equations to calculate the relative pose between the supporting legs, wherein the first equations are:

$$x_3 = (x_2 - x_1) \times \cos\theta_1 + (y_2 - y_1) \times \sin\theta_1;$$

and $$\theta_3 = \theta_2 - \theta_1;$$

where $x_1$, $y_1$, and $\theta_1$ represent the current supporting pose, $x_1$ represents a displacement in the x direction of a global coordinate system, $y_1$ represents a displacement in the y direction of the global coordinate system, and $\theta_1$ represents a yaw angle; $x_2$, $y_2$, and $\theta_2$, represent the preset ideal supporting pose of the next step, $x_2$ represents a displacement in the x direction of the global coordinate system, $y_2$ represents a displacement in the y direction of the global coordinate system, and $\theta_2$ represents a yaw angle; and $x_3$ is a lateral displacement of the relative pose between the supporting legs, $y_3$ is a forward displacement of the relative pose between the supporting legs, and $\theta_3$ is a yaw angle of the relative pose between the supporting legs.

14. The robot of claim 13, wherein the instructions for calculating the one or more gait parameters of the next step of the biped robot based on the relative pose between the supporting legs and the joint distance of the left and right ankle joints of the biped robot in the initial state of the biped robot comprise:
  instructions for identifying whether the current supporting leg is a right foot of the two supporting legs;
  instructions for substituting the relative pose between the supporting legs and the joint distance into second equations to calculate the one or more gait parameters of the next step in response to the current supporting leg being the right foot, wherein the second equations are:

$x_4 = x_3 - \alpha/2 \times \sin\theta_3$;

$y_4 = y_3 - \alpha/2 \times (1+\cos\theta_3)$; and $\theta_4 = \theta_3$;

where, $x_4$ is a lateral displacement of the one or more gait parameters of the next step, $y_4$ is a forward displacement of the one or more gait parameters of the next step, and $\theta_4$ is a yaw angle of the one or more gait parameters of the next step, and $\alpha$ is the joint distance; and
  instructions for substituting the relative pose between the supporting legs and the joint distance into third equations to calculate the one or more gait parameters of the next step in response to the current supporting leg being not the left foot, wherein the third equations are:

$x_4 = x_3 - \alpha/2 \times \sin\theta_3$;

$y_4 = y_3 - \alpha/2 \times (1+\cos\theta_3)$; and $\theta_4 = \theta_3$;

15. A non-transitory computer readable storage medium for storing one or more computer programs, wherein the one or more computer programs comprise:
  instructions for obtaining, by a camera on a biped robot, a current supporting pose of a current supporting leg of the two supporting legs of the biped robot in a global coordinate system, wherein the biped robot is moved according to a preset motion path in an entire environment, and a starting point of the Motion path is taken as an origin of the global coordinate system;
  instructions for calculating a relative pose between the two supporting legs of the biped robot based on the current supporting pose and a preset ideal supporting pose of a next step of the biped robot, wherein the relative pose between the two supporting legs is the preset ideal supporting pose of the next step with respect to the current supporting pose;
  instructions for calculating one or more gait parameters of the next step of the biped robot based on the relative pose between the supporting legs and a joint distance of left and right ankle joints of the biped robot in an initial state of the biped robot; and
  instructions for controlling a next supporting leg of the two supporting legs of the biped robot to move according to the one or more gait parameters of the next step.

16. The storage medium of claim 15, wherein the instructions for obtaining the current supporting pose of the current supporting leg of the two supporting legs of the biped robot comprise:
  instructions for obtaining a centroid pose of a centroid of the biped robot in the global coordinate system and a supporting pose of the current supporting tog in a centroid coordinate system, wherein the centroid coordinate system is built by taking the centroid of the biped robot as an origin of the centroid coordinate system, and the global coordinate system corresponds to the entire environment the biped robot being located; and
  instructions for obtaining the current supporting pose of the current supporting leg in the global coordinate system through a coordinate system transformation based on the supporting pose and the centroid pose.

17. The storage medium of claim 16, wherein the centroid is a midpoint of a straight line between two hip joints of the biped robot, and the instructions for obtaining the supporting pose of the current supporting leg in the centroid coordinate system comprise:
  instructions for obtaining a hip joint angle, a knee joint angle, and an ankle joint angle of the current supporting leg; and
  instructions for analyzing the supporting pose of the current supporting leg in the centroid coordinate system based on the hip joint angle, the knee joint angle, the ankle joint angle, a thigh length of the current supporting leg, a calf length of the current supporting leg, and a distance between the two hip joints of the biped robot.

18. The storage medium of claim 15, wherein the instructions for controlling the next supporting leg of the two supporting legs of the biped robot to move according to the one or more gait parameters of the next step comprise:
  instructions for performing an amplitude limiting on the one or more gait parameters of the next step based on one or more preset ideal gait parameters of the next step to obtain one or more modified gait parameters; and
  instructions for controlling the next supporting leg to move according to the one or more modified gait parameters.

19. The storage medium of claim 18, wherein the one or more computer programs further comprise:
  instructions for determining whether a collision will occur after the next supporting leg moves according to the one or more modified gait parameters;
  instructions for correcting the one or more modified gait parameters according to a pose of an object going to collide with the next supporting leg to obtain one or more second modified gait parameters, in response to the collision will occur after the next supporting leg moves according to the one or more modified gait parameters; and
  instructions for controlling the next supporting leg to move according to the one or more second modified gait parameters to avoid collision.

20. The storage medium of claim 18, wherein the one or more gait parameters comprise a forward displacement, a lateral displacement, and a yaw angle, and the instructions for calculating the relative pose between the supporting legs of the biped robot based on the current supporting pose and the preset ideal supporting pose of the next step of the biped robot comprise:
  instructions for substituting the current supporting pose and the preset ideal supporting pose of the next step into first equations to calculate the relative pose between the supporting legs, wherein the first equations are:

$$x_3 = (x_2 - x_1) \times \cos\theta_1 + (y_2 - y_1) \times \sin\theta_1;$$

and $$\theta_3 = \theta_2 - \theta_1;$$

where $x_1$, $y_1$, and $\theta_1$ represent the current supporting pose, $x_1$ represents a displacement in the x direction of a global coordinate system, $y_1$ represents a displacement in the y direction of the global coordinate system, and $\theta_1$ represents a yaw angle; $x_2$, $y_2$, and $\theta_2$ represent the preset ideal supporting pose of the next step, $x_2$ represents a displacement in the x direction of the global coordinate system, $y_2$ represents a displacement in the y direction of the global coordinate system, and $\theta_2$ represents a yaw angle; and $x_3$ is a lateral displacement of the relative pose between the supporting legs, $y_3$ is a forward displacement of the relative pose between the supporting legs, and $\theta_3$ is a yaw angle of the relative pose between the supporting legs.

* * * * *